UNITED STATES PATENT OFFICE.

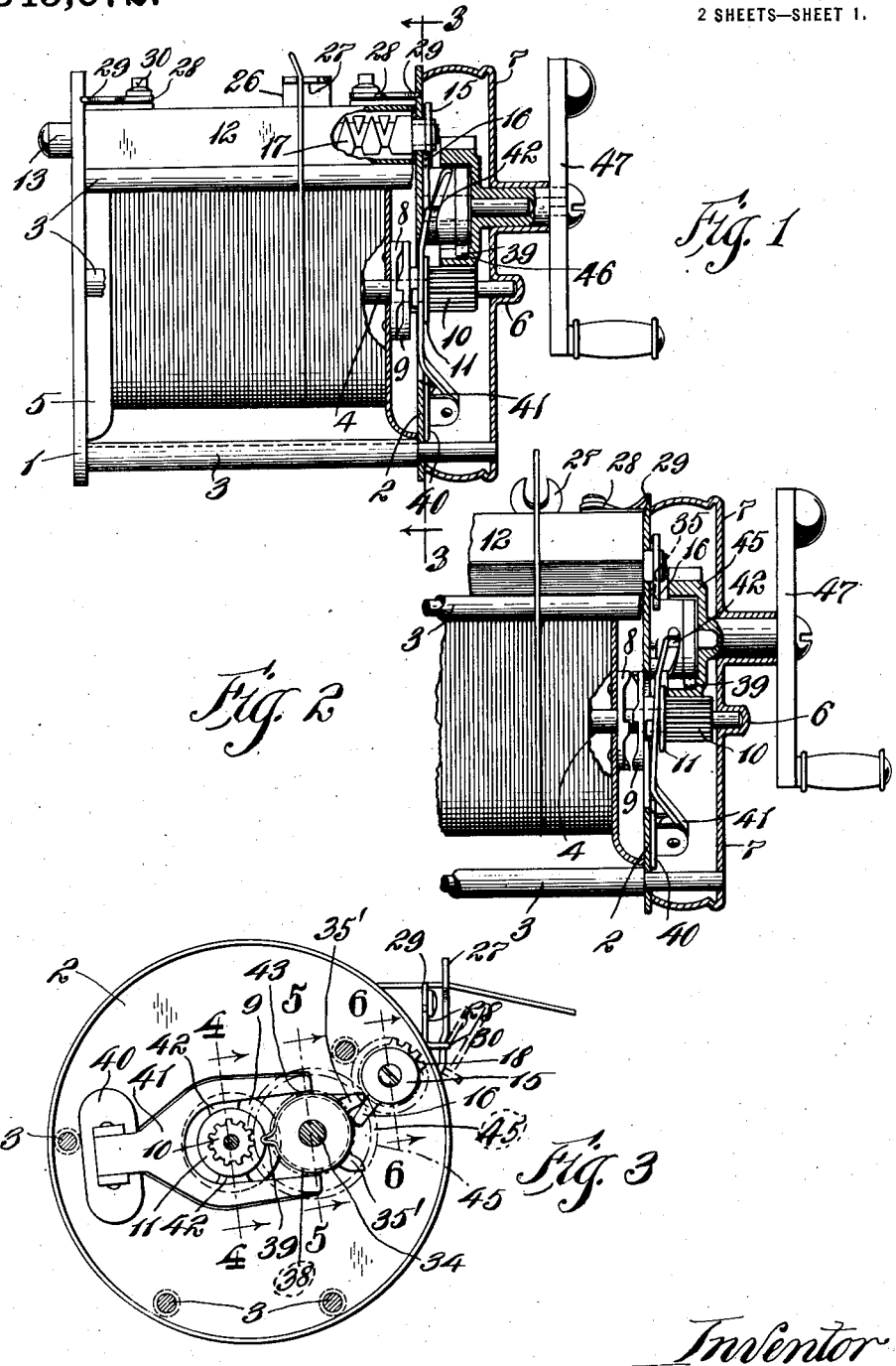

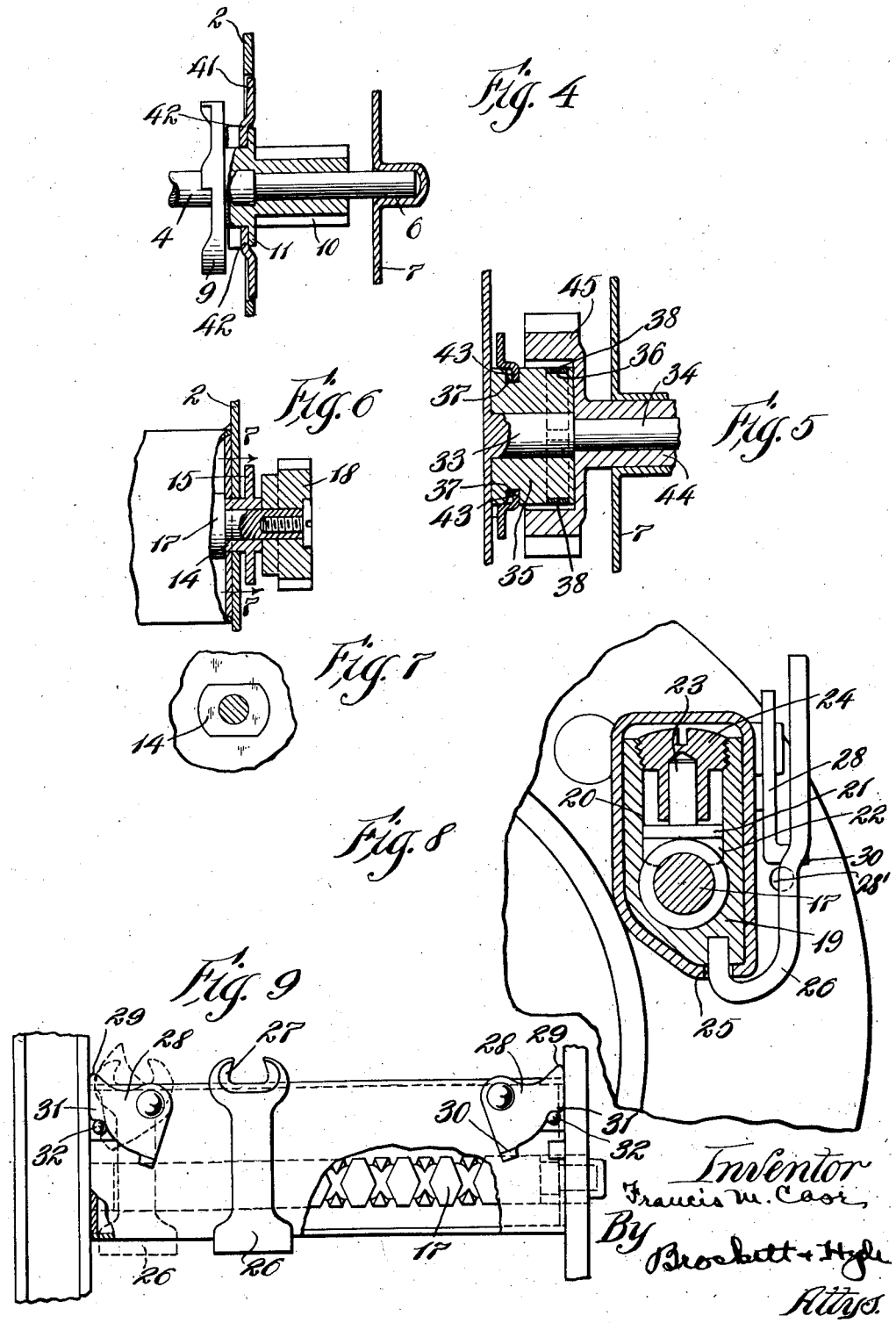

FRANCIS M. CASE, OF CLEVELAND, OHIO, ASSIGNOR TO THE ENTERPRISE MANUFACTURING COMPANY, OF AKRON, OHIO, A CORPORATION OF OHIO.

FISHING-REEL.

1,345,072.  Specification of Letters Patent.  Patented June 29, 1920.

Application filed March 29, 1917. Serial No. 158,287.

*To all whom it may concern:*

Be it known that I, FRANCIS M. CASE, citizen of the United States, residing at Cleveland, in the county of Cuyahoga and State of Ohio, have invented certain new and useful Improvements in Fishing-Reels, of which the following is a specification.

This invention relates to fishing reels generally and particularly to such devices of the level wind free spool type.

Heretofore reels of this type have been constructed so that the spool has been connected and disconnected with the driving mechanism by means of a clutch under the control of a device actuated by a friction or spring tension upon the same and the level winding mechanism has been thrown into and out of operative position by a friction or tension device coöperative with the double screw thus not only increasing the number of parts but also increasing the load on the driving mechanism, and thereby leading to the accompanying disadvantages.

The present invention herein disclosed is intended to do away with the double friction or tension means, and to employ one of such devices for performing the two functions, namely the coupling and uncoupling of this spool with the driving mechanism and the throwing of the level winding mechanism into and out of operative position.

The invention may be further briefly summarized as consisting in the construction and combination of parts hereinafter set forth in the following description, drawings and claims.

Referring to the drawings Figure 1 is a top plan view of a reel constructed according to my invention with parts broken away; Fig. 2 is a similar view with the level winding mechanism in inoperative position; Fig. 3 is an end elevation showing the gearing with the gearing cover removed and with the main driving gear removed; Fig. 4 is a detailed view in section showing the combined movable clutch and pinion as they are arranged on the spool shaft; Fig. 5 is a sectional view through the clutch throwing and drag or tension device; Fig. 6 is a sectional view through the level wind drive end of the level winding mechanism; Fig. 7 is a detail sectional view showing the connection between the level winding casing and the throwing member this view being indicated by the arrows 7—7 in Fig. 6; Fig. 8 is a sectional view through the level winding mechanism, and Fig. 9 is a front elevation of this mechanism with parts broken away.

In the embodiment shown in the drawings 1 and 2 are the end plates which are connected by suitable rods 3 in the usual manner common to the art. Mounted in a bearing in the end plate 1 is a spool shaft 4 provided with a spool 5. This shaft 4 projects through a suitable opening in the plate 2 and is mounted in a bearing 6 in a gear casing member 7 secured to the end 2 in any well known manner. The end of the spool adjacent the end plate 2 is provided with a clutch member 8, shown in Fig. 2 and adapted to engage a pinion clutch member 9 forming a part of a pinion 10. These two last mentioned parts are loose on the end of the spool shaft 4 and have endwise movement thereon. Between the pinion clutch member 9 and the pinion 10 an annular flange 11 is provided and this flange is spaced from the end face of the adjacent clutch member for receiving an operating lever as will appear.

The level winding mechanism is mounted between the end plates 1 and 2 and this mechanism will now be described.

The level winding mechanism comprises a casing 12 having a bearing in the bearing cap 13 at one end and a bearing sleeve 14 at the opposite end. This sleeve is flattened on opposite sides and this flattened portion passes through the end plate 2 and has a bearing therein and passes tightly through an operating or throwing member 15 fast on the sleeve. This member 15 has a radially extending arm 16 shown clearly in Fig. 3. This arm is used for throwing the level winding mechanism into and out of operative position as will appear.

Rotatably mounted in the cap 13 and in the sleeve 14 is a double spirally grooved shaft 17 common in the art and this shaft is projected beyond the throwing member 15 and is there provided with a driving pinion 18 in driving alinement with the spool pinion 10 but at a distance therefrom Within the casing 12 is a slide 19 fitting loosely within the casing and having an opening for the shaft 17. The slide is provided with another radially disposed opening 20 receiving a nut 21 having a pin 22 engaging in the spiral groove of the shaft 17. A shaft 23 is provided on the nut 21 and this shaft is guided in the plug 24 threaded into the opening 20. Secured in the slide 19 and extending through a slot 25 in the bottom of the casing 12 is a line guiding member 26 having a guiding eye 27 arranged above the plane of the top of the casing 12, as shown, and this eye guides the line so that it is laid level on the spool. Suitable line raising devices are provided at the end of the path of movement of the guide and each consists of a pivoted plate 28 having a line engaging hook 29 and two shoulders 30 and 31 arranged on either side of a pin 32 secured in the casing 12. The specific construction of this line raising mechanism forms no part of this application but is set forth in my co-pending application Serial No. 115,058 filed August 15, 1916.

Between the pinion 10 and the pinion 18 is a stud 33 secured to the end plate 2 and having a reduced shaft portion 34. Rotatably mounted on the stud 33 is a drag or friction sleeve 35 which has an annular groove 36 near its outer face and diametrically disposed inclined recesses 37 near its inner face. Engaging in the groove 36 is a flat spring 38 conforming to the body of the sleeve in the groove with unattached ends and with a loop 39 extending out beyond the periphery of the sleeve and in opposition to the free end of the spring. This spring tends to clamp or hug the sleeve and its rotation with respect to the sleeve tends to rotate the latter, but obviously will yield when a sufficient load is placed upon the sleeve. The sleeve 35 is also provided with spaced arms 35' extending from its periphery on either side of the arm 16 as shown in Fig. 3 and for a purpose which will presently appear.

Pivotally mounted in a bracket 40, secured to the end plate 2, is a clutch lever 41 having a bifurcated end forming side arms which are provided with inwardly extending clutch engaging lugs 42, engaging between the flange 11 and the clutch member 9, and lugs 43 engaging in the inclined recesses 37. These parts are arranged so that upon a clockwise rotation of the spring 38, as shown in Fig. 3, the sleeve will rotate with it by reason of the drag or friction already referred to, and this rotation causes the walls of the incline recesses 37 to move the lever 41 to the left as shown, in Figs. 1 and 2, whereupon the clutch member 9 is thrown into engagement with the clutch member on the spool. This obviously not only brings the clutch members into driving engagement but also causes one of the arms 35' to engage the arm 16 and rocks the level winding mechanism into operative position or that shown in full lines, Fig. 3. When a pull occurs on the line and there is a release of the drive this spool tends to rotate in the reverse thus imparting a reverse rotation to the spring 38 through the driving gear, to be described, and thereby rotating the sleeve in the reverse direction. This produces a release of the spool and shifts the level winding mechanism to the dotted line position, Fig. 3, in which the casing 12 strikes the stop pin 28', shown in Fig. 8. Rotatably mounted on the shaft end 34 is a main gear hub 44 carrying a gear 45 which is hollowed out to receive a portion of the sleeve 35 and the spring 38. The gear has a socket or recess 46 for the loop 39 of the spring 38. This gear meshes with the pinions 10 and 18 and provides a means for driving these parts. The hub 44 is provided with a crank 47 on the outside of the gear casing 7.

The teeth of the pinions and the gear are inclined so that the two directions thereof tend to assist the sleeve in its shifting of the parts actuated by it. For example the inclination of the teeth of the pinion 10 tends to move it outward when the spool is rotated by a pull on the line and this tendency assists the camming effect of this sleeve to release the spool and shift the level winding mechanism.

In using the reel the line is cast in the usual manner whereupon it will pay out freely, the reel disengaging itself from the drive in the manner already described and the level winding mechanism automatically moving out of the path of the out running line in the manner which has been described. When the operator wishes to reel in the line the crank is rotated by turning it in a clockwise direction with reference to Fig. 3, whereupon the drag upon the drag sleeve or friction device will cause the lever 41 to engage the clutch and will also cause the level wind device to be thrown into operative position by the engagement of one of the arms 35' with the arm 16. The line will then be wound evenly upon the spool. If pull should occur upon the line and the user should desire to let the line run, a slight release on the crank will permit the spool to throw out the clutch and the level wind mechanism when the line will reel off freely.

What I claim is:—

1. In a fishing reel, a spool, a level winding mechanism, driving mechanism for the spool and for the level winding mechanism, and a single device under the control of the driving mechanism for coupling and uncoupling the spool with the driving mechanism and for moving the level wind mechanism into and out of operative position with respect to the line.

2. In a fishing reel, a spool, a level winding mechanism having an operative and inoperative position with respect to the line, driving means, and a single frictional device for controlling the drive to the spool and the position of the level wind mechanism.

3. In a fishing reel, a frame, a spool mounted therein, a level winding mechanism mounted in the frame and supported for movement to operative or inoperative position with respect to the line, driving means, clutch mechanism between the driving means and the spool, suitable gearing between the level winding mechanism and the driving means, and a single means actuated by the driving means and controlling the clutching of the spool to the driving means and the movement of the level winding mechanism into operative or inoperative position with respect to the line.

4. In a fishing reel, a frame, a spool mounted therein, a level winding mechanism mounted in the frame and supported for movement to operative or inoperative position with respect to the line, driving means, clutch mechanism between the driving means and the spool, suitable gearing between the level winding mechanism and the driving means, and a single frictional device operatively connected to the clutch and operatively connected to the level winding mechanism and adapted to control the operation of the clutch and the position of the level winding mechanism.

5. In a fishing reel, a frame, a spool mounted therein, a level winding mechanism mounted in the frame and supported for movement to operative or inoperative position with respect to the line, driving means, clutch mechanism between the driving means and the spool, suitable gearing between the level winding mechanism and the driving means, a friction sleeve, connections between the friction sleeve and the clutch whereby the clutch is thrown by the rotation of the sleeve and connections between the sleeve and the level winding mechanism for controlling the position of the level winding mechanism.

6. In a fishing reel, a frame, a spool mounted therein, a level winding mechanism mounted in the frame and supported for movement to operative or inoperative position with respect to the line, driving means, clutch mechanism between the driving means and the spool, suitable gearing between the level winding mechanism and the driving means, a friction sleeve, friction drive connections between said sleeve and the driving means whereby the sleeve is turned yieldingly by the driving means, suitable connections between the sleeve and the clutch whereby the latter is operated by the sleeve, and connections between the sleeve and the level winding mechanism whereby it is operated by the sleeve and is brought into its proper position with respect to the operation of the spool.

7. In a fishing reel, a frame, a spool mounted therein, a level winding mechanism mounted in the frame and supported for movement to operative or inoperative position with respect to the line, driving means, clutch mechanism between the driving means and the spool, suitable gearing between the level winding mechanism and the driving means, a friction sleeve, operative connections between said sleeve and the spool clutch, yielding driving connections between the sleeve and the driving means, and operative connections between said sleeve and the level winding mechanism and comprising interlocking arms.

8. In a fishing reel, a frame, a spool mounted therein, a level winding mechanism mounted in the frame and supported for movement to operative or inoperative position with respect to the line, driving means, clutch mechanism between the driving means and the spool, suitable gearing between the level winding mechanism and the driving means, a friction sleeve having an inclined recess, yielding driving connections between the sleeve and the level winding mechanism for moving it into its proper position, and a clutch lever engaging the spool clutch and by its movement operating the same, said lever having a projection engaging the inclined recess in the friction sleeve.

9. In a fishing reel, a frame, a spool rotatably mounted therein, a level winding mechanism mounted therein and comprising a casing movable in the frame, a feed screw and a guide actuated thereby; a spool clutch, driving means, driving connections between the spool clutch and driving means and also between the feed screw of the level winding mechanism and the driving means, a friction sleeve rotatably mounted on the frame and having a camming portion, friction driving connections between said sleeve and the driving means, a clutch lever pivotally mounted on the frame and engaging the spool clutch and the camming portion of the friction sleeve, and interlocking arms carried by the friction sleeve and the level wind casing whereby upon a movement of the friction sleeve the level wind casing is moved to either operative or inoperative position with respect to the line.

10. In a fishing reel, a spool, a level winding mechanism, movable into and out of coöperating relation with the line, a driving member for operating the parts of the reel and means associated with the driving member and actuated thereby for controlling the relation of the level winding mechanism with respect to the line.

11. In a fishing reel, a spool, a level winding mechanism movable into and out of coöperating relation with the line, a driving member for operating the parts of the reel, driving connections between said driving member and the level winding mechanism, and means independent of said driving connections and actuated by the driving member for controlling the relation of the level winding mechanism with respect to the line.

12. In a fishing reel, a spool, a level winding mechanism movable into and out of co-operating relation with the line, a driving member for operating the parts of the reel, gearing between said driving member and the level winding mechanism, and means independent of said gearing and actuated by the driving member for controlling the relation of the level winding mechanism with respect to the line.

13. In a fishing reel, a spool, a level winding mechanism movable into and out of co-operating relation with the line, a driving member for operating the parts of the reel, driving connections between said driving member and the level winding mechanism, and means independent of said driving connections and actuated by the driving member for controlling the position of the level winding mechanism, and comprising a sleeve, yielding driving connections between said sleeve and the driving member, and means actuated by said sleeve for shifting said level winding mechanism with respect to the line.

14. In a fishing reel, a spool, a level winding mechanism movable into and out of co-operating relation with the line, a main driving member for operating the parts of the reel, driving connections between said main driving member and the level winding mechanism, and means independent of said driving connections and actuated by the driving member for controlling the position of the level winding mechanism, and comprising a sleeve, a spring having frictional engagement with said sleeve, driving connections between the spring and the main driving member, and means between the sleeve and the level winding mechanism for shifting the latter with respect to the line.

15. In a fishing reel, a spool, a main driving member for the reel, driving connections between the main driving member and the spool and including a clutch, and means associated with and actuated directly by the main driving member and independent of the driving connections between it and the spool for actuating the clutch.

16. In a fishing reel, a spool, a main driving member for the reel, driving connections between the main driving member and the spool and including a clutch, and means associated with and actuated by the driving member and independent of the driving connections between it and the spool for actuating the clutch, and comprising a sleeve, a yielding driving connection between said sleeve and the main driving member, and means actuated by said sleeve for throwing the clutch.

17. In a fishing reel, a spool, a main driving member for the reel, driving connections between the main driving member and the spool and including a clutch, and means associated with and actuated by the main driving member and independent of the driving connections between it and the spool for actuating the clutch, and comprising a sleeve, a spring having frictional engagement therewith, driving connections between the spring and the main driving member, and means actuated by the sleeve for throwing the clutch.

In testimony whereof I affix my signature.

FRANCIS M. CASE.